United States Patent [19]

Tanizaki et al.

[11] Patent Number: 4,569,326
[45] Date of Patent: Feb. 11, 1986

[54] DICING APPARATUS

[75] Inventors: Akinori Tanizaki, Yokohama; Noboru Ando, Sagamihara; Satoshi Terayama, Kawasaki; Kunimichi Nakao, Yokohama, all of Japan

[73] Assignee: Fujitsu Limited, Kawasaki, Japan

[21] Appl. No.: 628,862

[22] Filed: Jul. 9, 1984

[30] Foreign Application Priority Data

Jul. 8, 1983 [JP] Japan .................. 58-124517

[51] Int. Cl.⁴ .................... B28D 1/04
[52] U.S. Cl. .................... 125/13 R; 51/267
[58] Field of Search .................... 51/267; 125/13, 15

[56] References Cited

U.S. PATENT DOCUMENTS

| 2,163,687 | 6/1939 | Jacobsen | 51/267 |
| 3,886,925 | 6/1975 | Regan | 125/15 |

FOREIGN PATENT DOCUMENTS

| 223824 | 1/1943 | Switzerland | 51/267 |
| 865811 | 4/1961 | United Kingdom | 125/15 |

Primary Examiner—Harold D. Whitehead
Attorney, Agent, or Firm—Armstrong, Nikaido, Marmelstein & Kubovcik

[57] ABSTRACT

A dicing apparatus for cutting a semiconductor wafer into a plurality of a microelectronic circuit dice each having bonding pads which are located adjacent a cutting path on the wafer. The apparatus comprises a diamond dicing blade which is held between a pair of flanges, fitted to a spindle rotating at very high speed, the blade cutting the wafer along the cutting path in an up-cut and down-cut mode. Cooling wafer is applied from both sides of the rotating flanges and dicing blade, from a coolant nozzle and flows against a cutting interface. Each flange has an outer side surface such that, as the flange rotates, the major quantity of the cooling water flows along the outer side surface and violently flows onto a surface of the wafer which is beyond the edge of the bonding pad, to avoid the cutting debris from being driven into the bonding pad, when the dicing blade works in the down-cut mode. Each coolant nozzle is in the form of a slit along a coolant pipe which is located in parallel with and close to the surface of the wafer. The slit has a guard or a guide so that the cooling water spurts from the nozzle and flows toward the cutting interface at an angle to the surface of the wafer for cooling the cutting interface and effectively cooperating with the rotating flanges and dicing blade.

8 Claims, 17 Drawing Figures

FIG.2a
PRIOR ART
FIG.2b
PRIOR ART
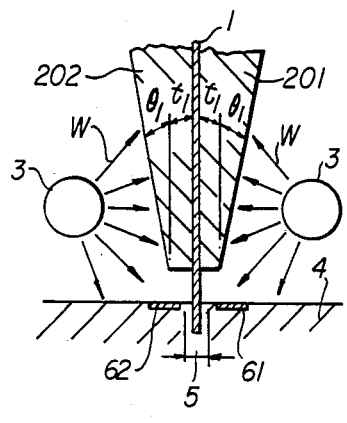
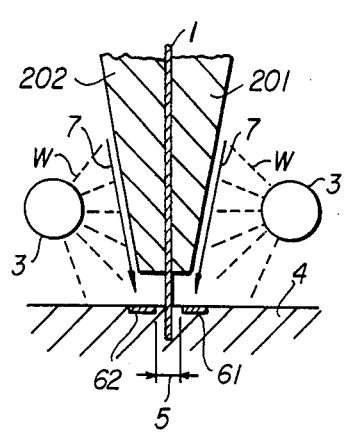
FIG.3a
FIG.3b
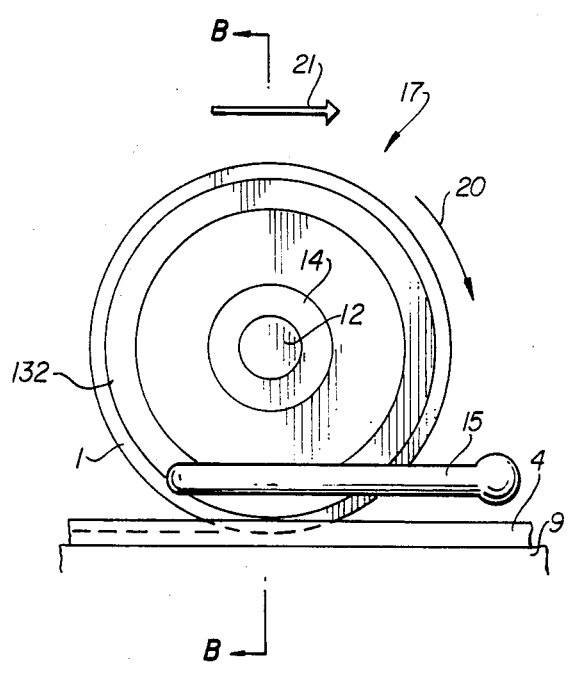
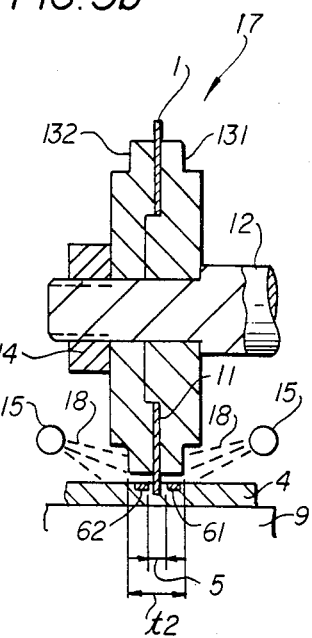

DICING APPARATUS

BACKGROUND OF THE INVENTION

1. Field of the Invention

This invention relates to a dicing apparatus for microelectric circuit fabrication such as semiconductor integrated circuits or large scale integrated circuits in which a wafer is separated into individual small-dimensioned die.

2. Description of the Prior Art

Generally, there are three types of the dicing apparatus: diamond scribing, laser scribing, and a diamond wheel sawing type. The diamond wheel sawing type cuts the wafer using a rotating diamond dicing blade. In order to cut precisely, the dicing blade has a very sharp circular edge in the range of 10–30 $\mu$ thickness and rotates at very high speeds in the range of 20,000–30,000 revolutions per minute. The dicing blade is formed as a very thin disk having a hole at the center and is fitted on a rotating spindle, being held between two flanges.

Furthermore, the dicing apparatus has a cooling system which pours coolant against a cutting interface. Water sprayed from a coolant nozzle is usually used as a coolant to: first lower the temperature at the face; second provide lubrication between the cutting edge and the wafer; and finally, clean the cutting debris away from the cutting area. Prior art devices have the disadvantage that the debris causes damage to the wafer or die being cut.

FIGS. 1a and 1b show prior art dicing apparatus using a dicing blade. Referring to FIGS. 1a and 1b, a dicing blade 1 is held by flanges 201 and 202 from both sides of the dicing blade, the flanges being fitted on a spindle 12, and fixed by a nut 14. Coolant nozzles 3 are connected to a coolant pipe from which cooling water 7 is sprayed and flows in a direction 8 because of the rotation of flanges 201 and 202 and blade 1. A wafer 4 is cut along a dicing path along which the wafer 4 is separated into dice. Bonding pads 61 and 62 on each dice are for the bonding of a lead wire during the process of die assembling. The wafer is mounted on a platform 9 for cutting. The arrow 20 indicates the direction of rotation dicing blade 1, and the arrow 21 indicates the running direction of the rotating spindle 12.

There are two cutting modes when the dicing blade saws the wafer: one is a up-cut mode and the other is a down-cut mode. FIG. 1a shows the dicing apparatus working in the down-cut mode, and if the direction of 20 or 21 is reversed, the cutting mode would be changed to an up-cut mode. Usually these two cutting modes are used to save time in the cutting process by running the dicing blade back-and-forth on the wafer. However, when the dicing blade works in the down-cut mode, much of the cutting debris hits the surface of the wafer with the cooling water splashed by the rotating flange causing damage to the bonding pads on the wafer.

The surface of the wafer 4 is coated with a coating material such as a silicon dioxide or phospho-silicate glass to protect the fabricated microelectronic circuit on the wafer from damage and dirt. However, the coating material can not be applied on the bonding pads and the dicing paths, because the bonding pads are for bonding the lead wires and the dicing paths are for cutting the water.

Above all, the bonding pads are very delicate, because they are made of the metal like aluminum, so the cutting debris easily is driven into them. If so, poor bonding or an increase in the connection resistance will occur after bonding. This has been a serious problem because it deteriorates the quality and reliability of the fabricated semiconductor die.

The problems in the prior art will be explained further in FIGS. 2a and 2b. FIG. 2a is a diagram of the areas around the cutting interface using the dicing apparatus of the prior art. FIG. 2b is also a diagram of the same cutting interface especially showing the flow of the cooling water being sprayed against the cutting interface. In the figures, reference numerals having the same numerals to FIGS. 1a and 1b indicate the same objects.

As shown in FIG. 2a, in the dicing apparatus of the prior art, the flanges 201 and 202 are made so that each flange becomes thinner to decrease the weight of the flanges in order to maintain the high speed rotation of the dicing blade. The width ($t_1$) at the circumference of the flange edge is in the range of 200–300 $\mu$m, and an angle ($\theta_1$) between tapered side-surface of the dicing blade is in the range of 10–17 degrees. On the other hand, each bonding pad is usually positioned so that the distance from the center of the dicing path 5 to the center of the bonding pad is approximately 100 $\mu$m. Consequently, as shown in FIG. 2b, the cooling water 7 from the coolant nozzle 3 is sprayed at the tapered side-surface of the flange 201 or 202 and flows along the tapered side-surface of the flange due to the centrifugal force of the flange rotation. The water flow 8 illustrates this. Therefore, the cooling water violently hits the bonding pads 61 or 62 and acts like a hammer, so that the water drives the cutting debris, which are on the bonding pad, into the bonding pad, or the water carries the cutting debris and drives them into the bonding pad 61 or 62. This has been a serious problem in the fabrication of microelectronic dice by dicing apparatus using the dicing blade of the prior art.

SUMMARY OF THE INVENTION

The primary object of the present invention is to avoid driving cutting debris into the bonding pad as a result of cooling water which is accelerated by the rotating surfaces of the rotating flanges which hold the dicing blade, during rotation thereof when cutting in the down-cut mode. This object can be achieved by changing the external form or position of the sides of the flanges and the opening structure of the coolant nozzles so as to change the flow of the cooling water.

It is a further object of the present invention to keep the surface of the bonding pad clean in order to prevent a poor bonding connection, thereby increasing the quality and the reliability of a fabricated semiconductor die and the yield of semiconductor device production.

The present invention is directed to a dicing apparatus for cutting a semiconductor wafer into a plurality of microelectronic circuit dice each having bonding pads which are located adjacent a cutting path on the wafer. The apparatus comprises a diamond dicing blade which is held between a pair of flanges, fitted to a spindle rotating at very high speed, the blade cutting the wafer along the cutting path in an up-cut and down-cut mode. Cooling water is applied from both sides of the rotating flanges and dicing blade, from a coolant nozzle and flows against the cutting interface. Each flange has an outer side surface such that, as the flange rotates, the major quantity of the cooling water flows along the formed outer side surface and violently flows onto a surface of the wafer which is beyond the edge of the bonding pad, to avoid the cutting debris from being driven into the bonding pad, when the dicing blade works in the down-cut mode. Each coolant nozzle is in the form of a slit along a coolant pipe which is located in parallel with and close to the surface of the wafer. The slit has a guard or a guide so that the cooling water spurts from the nozzle and flows toward the cutting interface at an angle to the surface of the wafer for cooling the cutting interface and effectively cooperating with the rotating flanges and dicing blade.

BRIEF DESCRIPTION OF THE DRAWINGS

FIG. 1b is a schematic sectional view along section A—A in FIG. 1a.

FIG. 2a is a fragmentary sectional view of the flanges, the dicing blade, and the coolant nozzles of the prior art apparatus.

FIG. 2b is a fragmentary sectional view of FIG. 2a showing the cooling water flowing along the rotating flanges and dicing blade.

FIG. 3a is a schematic front view of the embodiment of the dicing apparatus of the present invention.

FIG. 3b is a schematic sectional view along section B—B in FIG. 3a.

FIG. 5a is a schematic front view of the coolant nozzle of the present invention.

FIG. 5b is a schematic sectional view of the coolant nozzle of the present invention of FIG. 5a.

FIG. 6a is a schematic front view of another embodiment of the coolant nozzle of the present invention.

FIG. 6b is a schematic sectional view of the coolant nozzle of the present invention of FIG. 6a.

FIG. 7a is a schematic front view of still another embodiment of the coolant nozzle of the present invention.

FIG. 7b is a schematic sectional view of the coolant nozzle of the present invention of FIG. 7a.

FIG. 8a is a schematic front view of a further embodiment of the coolant nozzle of the present invention.

FIG. 8b is a schematic sectional view of the coolant nozzle of the present invention of FIG. 8a.

DESCRIPTION OF THE PREFERRED EMBODIMENT

Figure 1B:
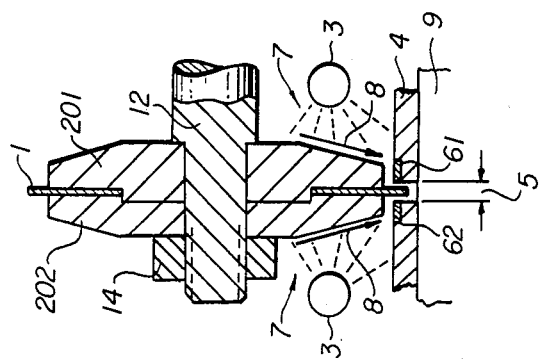
Figure 1A:
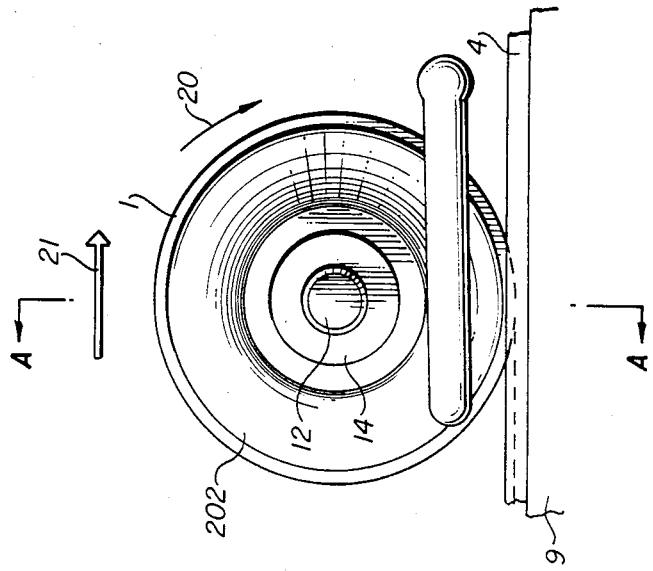
FIG. 1a is a schematic front view of a prior art dicing apparatus.

FIGS. 3a and 3b are similar Figures to FIGS. 1a and 1b except for the flanges and the coolant nozzles. In the figures, references numerals having the same numerals as FIG. 1a and 1b correspond to the same elements.

Referring to the drawings, dicing wheel 17 has flanges 131 and 132 which hold dicing blade 1. A coolant nozzle 15 sprays cooling water 16 against the cutting interface from the nozzle 15. The dicing wheel rotates in direction 20 and runs in direction 21 in the down-cut mode.

As seen in FIG. 3b, the side-surfaces of the flanges 131 and 132 and the upper surface of the wafer 4 meet at right angles. The thickness ($t_2$) of the flange edge part of the dicing wheel 17 is larger than the distance between the outer sides of bonding pads 61 and 62. For example, $t_2$ is 1 mm when the distance between the outer sides of bonding pads 61 and 62 is 200–400 $\mu$m. That is, the projected surface of the side surface of the flanges 131 and 132 cross the wafer 4 at the position from or beyond the bonding pads 61, 62. As a result, the cooling water splashed or sprayed by the rotating dicing wheel 17 at high speed contacts the surface of the wafer 4 beyond the edges of the bonding pads, thus avoiding a direct collision of the cooling water and the bonding pads 61 and 62. The thickness of the dicing wheel 17 near by the spindle 12 is set larger than $t_2$ as shown in FIG. 3b, this thickness is mainly to maintain the strength of the flanges 131 and 132, but there is an additional effect of improving the cooling water flow. This will be disclosed in the explanation of FIG. 4a.

Figure 4A:
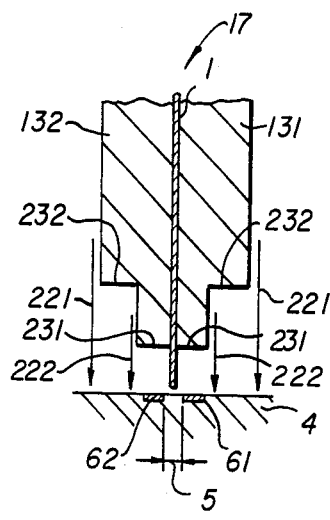
FIG. 4a is a fragmentary sectional view of the flanges of the present invention and the dicing blade with the cutting interface showing the cooling water flow along the rotating flanges and dicing blade.
Figure 4B:
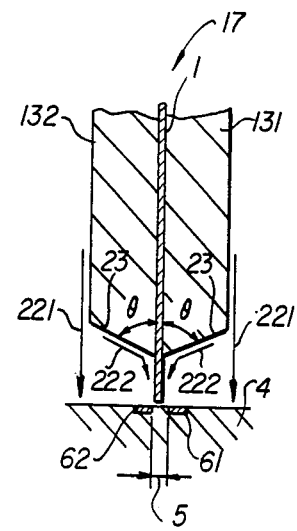
FIG. 4b is a fragmentary sectional view of another embodiment of the flanges of the present invention and the dicing blade with the cutting interface showing the cooling water flow along the rotating flanges and dicing blade.
Figure 4C:
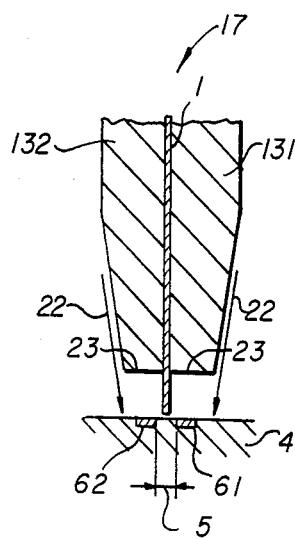
FIG. 4c is a fragmentary sectional view of still another embodiment of the flanges of the present invention and the dicing blade with the cutting interface showing the cooling water flow along the rotating flanges and dicing blade.

The flanges 131 and 132 in FIG. 3a and 3b are one embodiment of the flange of the present invention but there are other embodiments of the present invention. In FIGS. 4a, 4b and 4c, the same elements have the same reference numerals as in FIGS. 3a and 3b. In FIGS. 4a, 4b and 4c, the faces 231, 232 and 233 are at the circumference of the flanges 131 and 132, and arrow 221, 222 and 22 shows respectively the improved flow of the cooling water.

Referring to FIG. 4a, the improved flow of the cooling water is explained more fully. There are two kinds of cooling water flowing, one is an outer flow 221 and the other is an inner flow 222, each flow cooling and lubricating the cutting interface, and cleaning the debris away from the cutting area. The major flow is the outer flow 221 and the inner flow 222 is a minor flow. As noted above, the distance between the flow 222 at both sides of the dicing wheel 17 is larger than the distance between the outer sides of the bonding pads 61 and 62 locking from the dicing path 5. Furthermore, major cooling water flow 221 at both sides of the dicing wheel 17 is on the respective portions of the surface of the wafer 4, and each portion is in sufficient distance from the bonding pad 61 and 62. The cooling water of the flow 222 around the bonding pads 61 and 62 is minor, and the force of the cooling water flow 222 is so weak that the debris on the bonding pads 61 and 62 is minor and the force of the cooling water flow 222 is so weak that the debris on the bonding pads 61 and 62 are not driven into the pads. Consequently, damage to the bonding pads 61 and 62 by the the debris is avoided.

In the embodiment of FIG. 4b, the dicing wheel 17 is 3–4 mm thick to maintain the strength of the flanges 131 and 132, this thickness extending almost to the edge of the flange circumference. The side surface of the flanges 131 and 132 are in parallel with the surface of the dicing blade 1, and each edge-surface 23 at the circumference of flange 131 or 132 makes an angle $\theta$ which is greater than 60 degrees with respect to the surface of the dicing blade 1. The cooling water flows on both sides of the dicing wheel 17 from the nozzles and is accelerated by the centrifugal force of the rotating dicing wheel 17 and then the flow 221 violently hits respective portions of the surface of the wafer 4, however, each portion is a sufficient distance from the bonding pad 61 or 62. Minor cooling water flows along the flow 222 onto the cutting interface, however, as the force of the minor cooling water is weak and the direction thereof is not directly onto the bonding pads 61, 62, the bonding pads 61 and 62 are not damaged by the cutting debris. Consequently, the damage of the bonding pads 61 and 62 by the cutting debris can be avoided.

In the embodiment of FIG. 4c, the flanges 131 and 132 are tapered so as to decrease the weight of the dicing wheel 17. In this structure, the cooling water on both sides of the dicing wheel 17 are accelerated by the centrifugal force of the rotating dicing wheel 17 and the cooling water flows on a portion of the surface of the wafer 4. Therefore, in this case, the tapered angle must be made so that the portion the cooling water flow is a sufficient distance away from the bonding pad 61 or 62.

The coolant nozzle is another aspect of the present invention. As shown in FIGS. 3a and 3b of the present invention, the direction of each cooling water jet 16 from the respective coolant nozzle 15 is improved so that the cooling water from nozzle 15 flows at more of an angle to the surface of the cutting interface than in the prior art. Further, as the thickness of the flange of the present invention becomes thicker, the coolant nozzle 15 must be brought close to the surface of the wafer 4 as compared with the prior art. Also, since the quantity of the cooling water flowing to the cutting interface of the dicing blade caused by the centrifugal force is small in the present invention, the nozzle 15 is a horizontal slit so that the cooling water is concentrated onto the cutting interface of the dicing blade. As a result, the cooling water can be supplied sufficiently to the cutting interface, and the cutting speed can be increased without reducing the cutting quality.

Figures 5A, 5B:
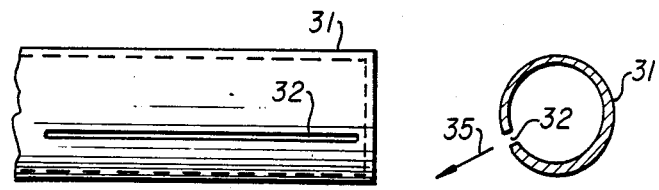

FIGS. 5a, 5b; 6a, 6b; 7a, 7b illustrate the embodiments of the nozzles of the present invention. In the figures, each figure "a" shows the side view and "b" shows a sectional view. A cooling water supply pipe 31 supplies cooling water jet 35 through slit 32. An uper guard 33 prevents the cooling water from spurting upward from the slit 32 and guides it downward towards the cutting interface. A nozzle guide 34 guides the cooling water spurting from the slit 32 to the designated cutting interface.

Figures 6A, 6B:
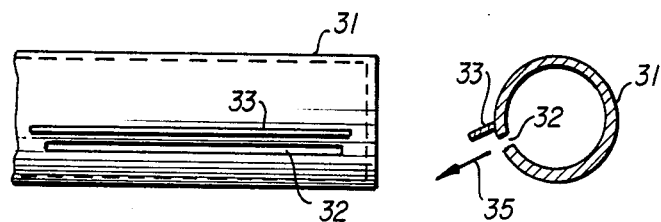
Figures 7A, 7B:
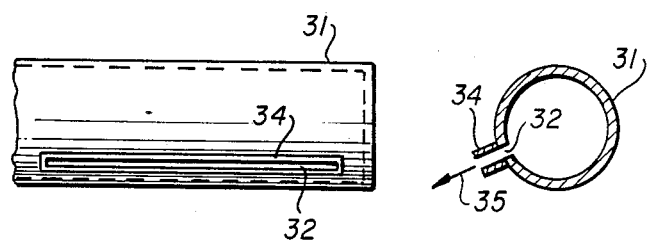
Figures 8A, 8B:
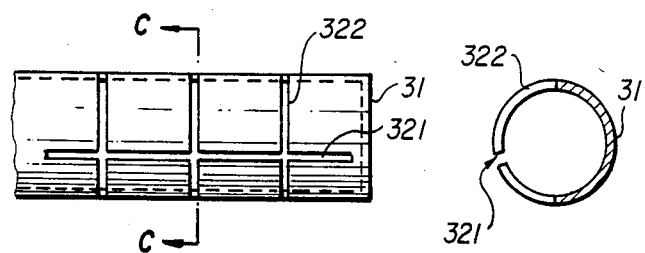

The slit 32 which runs parallel to the axis of the coolant pipe is parallel with the surface of the wafer, such as shown in FIG. 5a, 6a, or 7a can be used in a prior art coolant pipe having a plurality of the slits provided perpendicularly to the axis of the coolant pipe or to the surface of the wafer. This is shown in FIG. 8a and 8b. In FIGS. 8a and 8b, a coolant pipe 31 has vertical slits 322 of the prior art and horizontal slit 321 of the present invention. Thus, even a prior art coolant pipe can be improved so the cooling water flows properly and effectively to the cutting interface by providing the horizontal slit 321 in the coolant pipe 31.

Applying the present invention to a dicing apparatus, the cutting debris on the bonding pads can be prevented from being driven into the pads by the pressure of the cooling water, so that a poor bonding connection, caused by the cutting debris, can be avoided. As a result, the quality and the reliability of a fabricated semiconductor die and the yield of semiconductor device production can be substantially improved. For example, the number of defective pieces due to cutting debris being driven into the bonding pads was as much as 2-3% in the prior art, however, using the present invention, this has been improved to less than 0.2-0.3%.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. A dicing apparatus for separating a semiconductor wafer along a cutting path into a plurality of microelectronic circuit dice each having bonding pads along the opposite, adjacent sides of said cutting path on the surface of said wafer, said apparatus comprising:
   a rotating spindle;
   a dicing blade rotated by said spindle and having a cutting edge and parallel side surfaces;
   a pair of flanges fitted on said spindle for holding said dicing blade therebetween with said cutting edge extending therebeyond, each of said pair of flanges having an outer side surface with an edge thereof positioned above the surface of said wafer and outwardly from the side surface of said blade a distance at least as long as the width of said bonding pad along the side of said bonding pad;
   a coolant nozzle, positioned at the side of each of said flanges for providing substantially parallel flows of cooling water toward said dicing blade from the opposite side thereof, each said coolant nozzle extending substantially parallel to the path to be cut and having a coolant water ejecting slit extending longitudinally along and substantially parallel to the path to be cut for ejecting coolant water under pressure from the ejecting slit toward the outer side surface of the edge of said dicing blade, the major flow of coolant water from said ejecting slit striking said edge of the dicing blade.

2. A dicing apparatus according to claim 1, wherein the outer side surface of each of said flanges comprises:
   a first side surface parallel to the side surface of said dicing blade, said side surface having a large thickness wherein a major quantity of said cooling water flows along said first side surface and then flows onto the surface of said wafer beyond the edge of said bonding pad; and
   a second side surface parallel with the side-surface of said dicing blade, said second side surface, having a thickness less than the thickness of said the first side surface and a length substantially less than the length of said first side surface, wherein the total thickness of said dicing blade and said flanges at said second side surface is larger than the distance between the outer sides of said bonding pads, and a minor quantity of said cooling water flows along said second side surface and then flows to said cutting interface.

3. A dicing apparatus according to claim 1, wherein the outer side surface of each said flanges, comprises:
   a side surface parallel to the side surface of said dicing blade and having large thickness wherein said side surface extends over substantially all of the length of said flange, and wherein a major quantity of said cooling water flows along said side surface and then flows onto a surface of said wafer such that the flow beyond the edge of said bonding pad and wherein the total thickness of said dicing blade and said flanges at said side surface is larger than the distance between the outer sides of said bonding pads; and an edge surface of each said flanges near the circumferential edge of said dicing blade intersects the side surface of said dicing blade at an angle greater than 60 degrees.

4. A dicing apparatus according to claim 1, wherein the outer side surface of each said flange comprises:

a side surface portion tapered towards said dicing blade, said taper side portion being near the periphery of said flange, wherein the total thickness of said dicing blade and said flanges at the circumference of said each flange, is larger then the distance between outer edges of said bonding pads, and cooling water which flows along said tapered side surface of each said flange flows to a surface of said wafer that is beyond the outer edge of said bonding pad.

5. A dicing apparatus according to claim 1, wherein each said coolant nozzle is close to the surface of said wafer on each side of and close to the side surface a corresponding one of said flanges, and wherein said slit is positioned such that coolant therefrom flows at angle with respect to the surface of said wafer.

6. A dicing apparatus according to claim 5, wherein a guard is fixed at the upper side of said slit, in parallel with said slit, for preventing said cooling water from spurting upward from said slit.

7. A dicing apparatus according to claim 5, wherein a nozzle guide is fixed around said slit for guiding said cooling water from said slit to flow toward said cutting interface.

8. A dicing apparatus according to claim 5, further including a plurality of additional slits in said coolant pipe perpendicular to the surface of said wafer and integral with said parallel slit.

* * * * *